United States Patent [19]

Tonelli et al.

[11] Patent Number: 5,686,522
[45] Date of Patent: Nov. 11, 1997

[54] FLUOROMODIFIED POLYESTERS HAVING IMPROVED PROCESSABILITY

[75] Inventors: Claudio Tonelli, Concorezzo; Francesco Pilati, Bologna; Maurizio Toselli, Monte San Pietro; Antonio Turturro, Genoa; Ercole Gattiglia, Recco, all of Italy

[73] Assignee: Ausimont S.p.A., Milan, Italy

[21] Appl. No.: 352,825

[22] Filed: Dec. 2, 1994

[30] Foreign Application Priority Data

Dec. 6, 1993 [IT] Italy .................. MI93A2578

[51] Int. Cl.$^6$ .................................................. C08L 67/02
[52] U.S. Cl. .................... 524/539; 524/394; 524/400; 525/444; 528/491
[58] Field of Search .................. 525/444; 528/491; 524/394, 400, 539

[56] References Cited

U.S. PATENT DOCUMENTS 3,761,450 9/1973 Herwig et al. .................. 260/75
4,212,791 7/1980 Avery et al. .................. 260/40
4,996,269 2/1991 Richeson .................. 525/444

FOREIGN PATENT DOCUMENTS 0102768 3/1984 European Pat. Off. .
8703608 6/1987 WIPO .

OTHER PUBLICATIONS

CA77(6):35694w American Chemical Society, Abstract of JP 46,029,977, Aug. 1971 (Showa).

Primary Examiner—Patricia A. Short
Attorney, Agent, or Firm—Watson Cole Stevens Davis, P.L.L.C.

[57] ABSTRACT

Thermoplastic polyester compositions comprising polyester resin modified by introducing perfluoropolyether blocks in the polymeric chain characterized by high crystallization rate of the melted mass and therefore by an improved processability. In particular the use of such compositions in a process for preparing molded thermoplastic articles allows working at lower temperatures of the mold and with shorter molding times. Process for preparing modified resins.

12 Claims, No Drawings

FLUOROMODIFIED POLYESTERS HAVING IMPROVED PROCESSABILITY

The present invention relates to thermoplastic polyester resins having high crystallization rate, of interest especially in molding processes. In particular, the invention relates to the utilization of additives for polyester resins determining an increase in the crystallization rate and in the crystallization temperature of the melted resin and, in the case of the manufacture of molded articles, allows to adopt lower mold temperatures and shorter molding times.

As known, the thermoplastic polyesters, for instance the polyethyleneterephthalate (PET) have a broad utilization in the manufacture of fibers, films and blown articles (bottles for the food and drink industry by means of the so called stretch blow moulding), having good mechanical, thermal and electric properties and at the same time relatively low costs. On the other hand, the thermoplastic polyesters run into problems when used in the field of molding materials, especially owing to the low crystallization rate, which involves long molding cycles and high temperatures of the molds and therefore remarkable industrial, as well as economic, drawbacks. Moreover a possible crystallization completion in a subsequent time leads to a deterioration of the molded manufactured article (dimensional changes, surface ruffles). In the PET case in order to obtain a good formation of the crystalline phase, and therefore molded articles with a good surface and dimensionally stable, one must generally operate with the mold at a temperature of at least 130°–140° C.

According to the art, in order to overcome these difficulties, it has been resorted to the utilization of additives which by acting as nucleants, speed up the crystallization process. Most of the described additives are polar compounds, such as alkaline or alkaline-earth organic salts.

For instance in EP 102768 it is described the use of strongly polar and hydrophilic alkaline salts of ethyleneterephthalate oligomers as nucleant agents in the polyethyleneterephthalate crystallization. Similarly, in U.S. Pat. No. 3,761,450 it is described the utilization of lithium and sodium salts of organic polyacids in very fine particles instead of the already known mineral nucleants. In JP 46029977 it is described the use of sodium benzoate in the polyethyleneterephthalate molding in order to obtain a manufactured article with even crystallization.

In U.S. Pat. No. 4,212,791 there are described compositions based on polyester containing, besides a finely subdivided inert nucleating agent, also an oligomeric polyester and an elastomer having polyester-polyether blocks to favour the crystallization and improve the surface properties of the molded manufactured articles. The polyester-polyether in absence of the nucleating agent and of the oligomeric polyester has no effect on the crystallization rate; on the other hand, the presence of polar and hydrophilic groups in the oligomeric component makes the behaviour of these compositions similar to the one of the compositions containing the mentioned organic salts.

The utilization of the above mentioned additives or nucleating systems has the drawback to favour secondary reactions, acidolysis and formation of branches, besides hydrolysis caused by the moisture absorbed due to the presence of hydrophilic ionic groups, which especially during the transformation process lead to a decay of the mechanical properties of the manufactured article. All this has also the drawback to make it difficult the use of the working scraps and the possible secondary recycle of the material.

Now it has been surprisingly found that the presence in the polyester resins of a part of the resin itself modified through the introduction into the polymeric chain of chemically bound perfluoropolyether blocks, causes an increase in the rate and in the temperature of crystallization of the melted resin. So according to the present invention, molded thermoplastic manufactured articles, having high crystallinity, can be obtained by means of a process operating with shorter times and with lower mold temperature than the ones of the art, by using the compositions specified hereby. Such compositions comprise a polyester resin having a crystalline phase and a polyester resin modified by introducing polyoxyperfluoroalkylene blocks chemically bound in the main chains of polyester type.

Experiments carried out by the Applicant have actually led to obtain nucleants, the modified resins indicated hereinunder as component B, which allow to achieve a high rate and a high level in the crystallization of the polymeric mass, both in non-isotherm and in isotherm conditions, with the above mentioned operating advantages and without decay of the mechanical properties of the manufactured articles.

In the common case of the molding of a resin based on polyethyleneterephthalate, the utilization of the nucleants of the invention allows dropping of the temperature in the mold from a value of 130°–140° C., required for the non nucleated polymer, to a value of 90°–110° C., which still allows a complete development of the crystallinity and the dimensional stability of the manufactured article.

The nucleating action of said modified resins, due to the perfluoropolyeethereal chains confined in fluorinated microfields, is clearly noticed when the raw modified resin, coming from a polycondensation of polyester type of an acid, or a derivative thereof, with a compound having an alcoholic function in the presence of a perfluoropolyether diol, has been submitted to a solvent extraction treatment for the separation of the fraction comprising the unreacted perfluoropolyethereal component and the one chemically bound to short polyester sequences, where the polyester part is less important and the tendency to crystallize is lower. The result is particularly surprising if one considers that the nucleating action is exerted by an additive in liquid phase endowed with a polarity undoubtedly lower than that of the compounds utilized in the art.

Object of the present invention is therefore the utilization, in a process for preparing molded thermoplastic manufactured articles, of compositions crystallizable in the mold, comprising:

A) polyester resin, optionally branched by means of an amount of monomers having functionality >2 not higher than 1.5% by moles, having a crystalline phase and present in the composition in amount by weight equal to 90-40% of the sum of the weights of components A and B;

B) polyester resin comprising polyoxyperfluoroalkylene blocks and present in the composition in amounts by weight equal to 10–60% of the sum of the weights of components A and B, said resin being obtainable by an extraction treatment of the condensation product of a non fluorinated bicarboxylic acid, a perfluoropolyether diol and a non fluorinated diol, said extraction treatment comprising:

a) heat-dissolution in 1,1,2,2-tetrachloroethane of the condensation product of the monomers and subsequent precipitation in an excess of 1,1,2-trichloro-1,2,2-trifluoroethane;

b) filtration of the precipitated polymer and repetition of the same dissolution treatment and precipitation;

c) recovery by filtration of the solid residue; the content in fluorine by weight being comprised between 0.6 and 15% of the resin B and between 0.1 and 10%, preferably between 0.5 and 2, of the total weight of the components A and B.

All the polyester resins of the component B meeting the indicated extraction test, are suitable as nucleants according to the present invention. Surprisingly the nucleating effect is particularly evident only with the products submitted to extraction.

Generally, after the extraction process the polyester resin B, besides polyester chains containing polyoxyperfluoro-alkylenic blocks, still contains polyester chains without polyoxyperfluoroalkylene blocks, it does not contain free perfluoropolyether any longer, and it does not even contain polyester chains containing polyoxyperfluoro-alkylene blocks and generally having a molecular weight lower than 10,000.

Nucleating agents already known in the art, such as the mineral nucleants and the organic salts of the alkaline or alkaline-earth metals, can be included in the composition in order to favour the crystallization of the polyester resins. The utmost content by weight of these known nucleants is generally equal to 20% with respect to the weight of the component B.

The present invention can be applied to all the polyesters having a crystalline phase, the effect resulting much more marked as the crystallization rate of the unmodified polymer is lower. Preferably the invention applies to the case wherein the polyester of the component A or the polyester of the component B or both are polyethyleneterephthalates, obtainable from the condensation of terephthalic acid, optionally in mixture with ortho-phthalic or isophthalic acid in amounts by moles not higher than 10% of the total moles of acid or in mixture with trifunctional 5-sulphoisophthalic acid in amounts by moles not higher than 3% of the total moles of acid, the total amount of monomers having a functionality higher than 2 remaining below 1.5% of the total monomer units, with ethylene glycol or a derivative thereof, said acids being possibly utilized also under the form of derivative.

The invention applies in particular also to the case wherein the polyester resin in one or in both components of the composition derives from the condensation of terephthalic acid with ethylene glycol or 1,4-butandiol and a polyoxy-alkyleneglycol, in particular polyoxytetramethylene-glycol.

Preferably the perfluoropolyether blocks contained in the resin forming the component B of the compositions used in the present invention derive from a perfluoro-polyether diol, having number average molecular weight generally comprised between 500 and 8,000 and preferably between 800 and 2,000, belonging to one of the following classes of compounds:

i) HO—$(CH_2CH_2O)_z$—$CH_2CF_2O$—$(CF_2CF_2O)_m(CF_2O)_n$—$CF_2CH_2$—$(OCH_2CH_2)_z$—OH wherein z is 0, 1, 2 or 3; the m/n ratio is comprised between 0.2 and 2, preferably between 0.5 and 1.5, m and n have such values that the molecualr weight is in the above indicated limits, the units $(CF_2CF_2O)$ and $(CF_2O)$ being randomly distributed inside $(CF_2CF_2O)_m(CF_2O_n)$;

ii) HO—$CH_2CF_2$—$(C_3F_6O)_r(CF_2CF_2O)_s(CFXO)_t$—$CF_2CH_2$—OH wherein X=F or $CF_3$; $(C_3F_6O)$ is $(CF_2CF(CF_3)O)$ or $(CF(CF_3)CF_2O)$; r, s, t have such values that the molecular weight is in the above indicated limits, the units $(C_3F_6O)$, $(CF_2CF_2O)$ and $(CFXO)$ being randomly distributed inside $(C_3F_6O)_r(CF_2—CF_2O)_s(CFXO)_t$;

iii) HO—$CH_2CF_2CH_2$—$(OCF_2CF_2CH_2)_p$—O—$R_f$—O—$(CH_2CF_2CF_2O)_q$—$CH_2CF_2CH_2$—OH wherein $R_f$ is a perfluoroalkylene group; p, q have such values that the molecular weight is in the above indicated limits;

iv) A—$CF(CF_3)$—$(OCF_2CF(CF_3))_a$—$OCF_2$—$R_f$—$CF_2O$—$(CF(CF_3)CF_2O)_b$—$CF(CF_3)$—A' wherein $R_f$ is a perfluoroalkylene group; A and A' are end groups containing an hydroxyl, in particular they are —$CH_2OH$; a, b have such values that the molecular weight is in the above indicated limits.

Besides the surprising effect on the crystallization rate, the utilization of the fluorinated modifiers determines some other positive effects already known when perfluoropolyethers are present in the polymeric matrix: improvement in the surface properties, such as reduction of the friction coefficient and an improved resistance to abrasion; improvement in the chemical resistance; improvement in the processability due to the lubricating effect.

A further object of the present invention is formed by the compositions themselves, described above, crystallizable during the molding process.

Still another object of the present invention are the polyester resins modified with the introduction of polyoxyperfluoroalkylene blocks forming the above described component B. The resins of this type having intrinsic viscosity comprised between 0.5 and 0.95 dl/g in phenol/1, 1,2,2-tetrachloroethane 60/40 at 30° C. are preferred.

Said modified resins can be utilized both as master batch for polyester compositions of the previously described type, and as such. Besides the surprising effect on the crystallization rate, the modified resins according to the invention have also the other positive effects previously cited. An aspect not to be overlooked for the utilization of such resins is also the absence of the risk of transfer of fluorinated products by contact with solids or liquids, such a risk, on the contrary, being potentially present with unbound conventional additives with low molecular weight. If used as master batch, these resins are therefore multipurpose additives capable of improving under various aspects the properties and the processability of the polymeric compositions.

The process for preparing the above mentioned modified resins, which is likewise part of the present invention, comprises:

a) the polycondensation of the following components:

a1) hydrogenated diacid or diester or diacylhalide having the following general formula:

Y—CO—$R_2$—CO—Y' where Y and Y', equal or different each other, represent an halide or OR', R' being H or an alkylic radical containing from 1 to 8 carbon atoms or also an arylic radical having from 6 to 10 carbon atoms; $R_2$ is a divalent radical selected from the alkylene radicals having from 2 to 10 carbon atoms and the arylene radicals having from 6 to 12 carbon atoms and their mixtures;

a2) a diol, selected from aliphatic diols containing from 2 to 6 carbon atoms and alicyclic diols containing from 6 to 10 carbon atoms and their mixtures;

a3) a perfluoropolyether diol, having number average molecular weight generally comprised between 500 and 8,000 and preferably between 800 and 2,000, belonging to one of the above described classes of compounds;

such polycondensation being carried out under the typical conditions described in the art for the polycondensation of the polyester resins.

b) extraction from the crude copolymer, obtained by means of said condensation, of the fraction comprising the perfluoropolyethereal component not chemically bound to polyester sequences or bound to short polyester sequences, said extraction comprising the dissolution of the crude copolymer in a solvent of the polyester and the subsequent precipitation in a selective solvent capable of dissolving the perfluoropolyether and not the polyester.

The precipitate so obtained is recovered by filtration and drying, for instance at 100°–140° C. under vacuum for a night. Perfluoropolyethereal sequences exclusively bound to long polyester chains are present therein. If the polyester resin is polyethyleneterephthalate, the intrinsic viscosity of the remaining product after the extraction process is comprised between 0,5 and 0,95 dl/g in phenol/1,1,2,2-tetrachloroethane 60/40 at 30° C.

The extracted material, remained in solution at the end of the process of selective extraction, generally contains from 10 to 50% of the amount of perfluoropolyether initially introduced in the polymerization reactor, partly as unreacted diol and partly bound to short polyester chains. The molecular weight of the extracted material is generally included between 1,000 and 10,000, more often is around 5,000.

Preferred process is the one characterized in that in the phase b) the crude copolymer is dissolved in a solvent for polyesters selected from: 1,1,2,2-tetrachloroethane, nitrobenzene and orthochlorophenol at a temperature included between 80° and 150° C. or from mixtures phenol/1,1,2,2-tetrachloroethane, hexafluoroisopropanol/methylene chloride, hexafluoroisopropanol/chloroform, trichloroacetic acid/chloroform at room temperature; and in that the product with long chains containing the perfluoropolyether blocks is separated from the so obtained solution by precipitation in a solvent selected from a chlorofluorocarbon and an hydrogen-fluorocarbon, in particular from $CF_3$—$CHCl_2$, $CHClF$—$CF_3$, $CF_3$—$CH_2F$, $CHF_2$—$CH_2F$ and $CH_2F$—$CH_2F$.

The compositions and the modified resins of the present invention can be advantageously used, besides in the molding processes of manufactured articles also in the preparation of fibers and films, since the presence of the modified polyester makes easier the orientation of the chains. In this case the utilization of a polyester, which was modified but not submitted to the extraction treatment with solvent, has superior lubricating and barrier effects.

The following examples are given for illustrative purposes, not limitative of the possibilities of implementing the present invention.

EXAMPLE 1

Preparation of the Polyethyleneterephthalate

The polymerization was carried out starting from 194 g (1 mole) of dimethylterephthalate, 135 g (2.2 moles) of ethylene glycol and 0.2 g of tetrabutyltitanate as catalyst. The reactor temperature was gradually risen up to about 200° C. and kept at this value, at atmospheric pressure, until 95% of the theoretical amount of methanol had distilled (about 60 minutes). Subsequently vacuum was gradually made in the reactor, down to a final value of 0.5 mbar, to favour the distillation of the excess of ethylene glycol, while the temperature was risen up to 275° C. and kept at this value until the end of the polymerization (about 120 minutes). The polymerization completion was stated by surveying, by means of a suitable device, the torsional stress produced on the stirrer shaft.

The intrinsic viscosity of the obtained product, measured in phenol/1,1,2,2-tetrachloroethane 60/40 at 30° C. resulted to be 0.85 dl/g. The non isotherm crystallization temperature of the product, measured with a cooling rate of 10° C./min, resulted to be 188°±3° C.

EXAMPLE 2

Preparation of the Fluoromodified Polyethyleneterephthalate

The polymerization was carried out starting from 194 g (1 mole) of dimethylterephthalate, 135 g (2.2 moles) of ethylene glycol, 10.2 g (5% by weight with respect to the sum of dimethylterephthalate and of perfluoropolyether) of Fomblin ZDOLTX ($M_n$ 2200) and 0.2 g of tetrabutyltitanate as catalyst. The reactor temperature was gradually risen up to about 200° C. and kept at this value, at atmospheric pressure, until 95% of the theoretical amount of methanol had distilled (about 60 minutes). Subsequently the vacuum was gradually made in the reactor, down to a final value of 0.5 mbar, to favour the distillation of the excess of ethylene glycol, while the temperature was risen up to 275° C. and kept at this value until the end of the polymerization (about 120 minutes). The polymerization completion was stated by surveying, by means of suitable device, the torsional stress produced on the stirrer shaft.

The intrinsic viscosity of the obtained product, measured in phenol/1,1,2,2-tetrachloroethane 60/40 at 30° C. resulted to be 0.82 dl/g. The analysis of the content in fluorine allowed to state that the content in perfluoro-polyether in the final product was 3.2% by weight, equal to 60% of the initial amount. The non isotherm crystallization temperature of the product, measured with a cooling rate of 10° C./min, resulted to be 176°±2° C.

EXAMPLE 3

Extraction of the Perfluoropolyether Fraction not Bound to the Polyethyleneterephthalate or Bound to Short Poly-Ethyleneterephthalate Sequences The product obtained in example 2 was submitted to selective extraction in order to remove the perfluoropolyether fraction which at the polymerization end is not bound to polyethyleneterephthgalate chains or is bound to short sequences of monomeric units of polyethyleneterephthalate. To this end, 2 g of polymer were added to 25–30 ml of 1,1,2,2-tetrachloroethane. The suspension was then led to reflux for some minutes, up to complete solubilization of the polyester. The so obtained solution was slowly poured into 150 ml of 1,1,2-trichloro-1,2,2-trifluoroethane which is a good solvent for the perfluoropolyether but a non-solvent for the polyester. After filtration the remaining precipitate was redissolved and reprecipitated as described above.

The two filtrates so obtained, containing besides the solvent mixture the perfluoropolyether not bound or bound to short polyethyleneterephthalate chains, besides cyclic oligomers of the polyester, were joined and evaporated. 0.05 g of a product, which formed the total extract and was formed by about 80% of perfluoropolyether, the remaining 20% being formed by short sequences of Polyethyleneterephthalate and by hydrogenated cyclic oligomers, were so obtained. The molecular weight of the chains essentially containing perfluoropolyether bound to short sequences of polyethyleneterephthalate resulted to be included in the range 1,000– 6,000.

The residue after extraction had an intrinsic viscosity, measured in phenol/1,1,2,2-tetrachloroethane 60/40 at 30°

C. of 0.73 dl/g. The content in perfluoropoly-ether of such a residue resulted to be 1.2% by weight. The non isotherm crystallization temperature of the product, measured with a cooling rate of 10° C./min, resulted to be 204°±1° C., while with a cooling rate of 2° C./min it resulted to be 223° C.

EXAMPLE 4

Preparation of the Fluoromodified Polyethyleneterephthalate

The polymerization was carried out as in example 1, by adding however 21.5 g of Fomblin ZDOLTX ($M_n$ 2200), equal to 10% by weight with respect to the sum of the dimethylterephthalate and of the perfluoropolyether. The intrinsic viscosity of the obtained product, determined according to the already described operating modalities, resulted to be 0.63 dl/g. The analysis of the fluorine content allowed to state that the perfluoropolyether in the polymer was equal to 7.4% by weight (70% of the initial amount). The non isotherm crystallization temperature of the product, measured with a cooling rate of 10° C./min, resulted to be 176°±2° C.

EXAMPLE 5

Extraction of the Perfluoropolyether Fraction not Bound to the Polyethyleneterephthalate or Bound to Short Poly-Ethyleneterephthalate Sequences The product obtained according to what described in example 2 was submitted to tests of selective extraction according to the modalities described in example 3. 0.106 g of a product forming the total extract and which resulted to be formed by perfluoropolyether bound to short sequences of polyethyleneterephthalate and by cyclic oligomers, were obtained. The residue after extraction had an intrinsic viscosity of 0.72 dl/g. The content of perfluoro-polyether in the polymer after extraction resulted to be 3.4% by weight. The non isotherm crystallization temperature of the product, measured with a cooling rate of 10° C./min, resulted to be 205°±1° C.

EXAMPLE 6

Composition

A polyethyleneterephthalate prepared similarly to what described in examples 2 and 4, containing 13.3% by weight of perfluoropolyether quite bound to chains of polyethyleneterephthalate after selective extraction carried out as described in examples 3 and 5, was utilized in mixture with pure polyethyleneterephthalate, prepared according to what described in example 1, in order to speed up the crystallization rate of the last.

In a Brabender Plasticorder PL 2000 mixer 5 g of the above described fluoromodified polymer and 45 g of polyethyleneterephthalate were mixed at a temperature of 275° C. for 3 minutes at 60 rpm. The so obtained polymer contained 1.34% by weight of perfluoropolyether quite bound to long sequences of polyethyleneterephthalate and had a non isotherm crystallization temperature of 204°±1° C.

Comparison of the Crystallization Kinetics

Some of the above described examples were submitted to a compared evaluation of the crystallization kinetics in isotherm conditions, according to the above described operating modalities. The following results were obtained:

| Polymer | T (°C.) | K (min$^{-1}$) |
| --- | --- | --- |
| PET (Ex. 1) | 200 | 1,125 |
|  | 208 | 1,009 |
|  | 215 | 1,001 |
| PET modified, | 200 | 1,076 |
| before extraction (Ex. 2) | 208 | 1,006 |
|  | 215 | 1,000 |
| PET modified, | 220 | 1,100 |
| after extraction (Ex. 3) | 225 | 1,003 |
|  | 230 | 1,000 |

The data relative to the rate constant K confirm the remarkable accelerating effect of the fluorinated modifying agent on the crystallization rate of the polyethyleneterephthalate block, when the fluorinated modifying agent is bound to long sequences of polyethyleneterephthalate. As a matter of fact, at 220° C. the polymer of example 3 shows a rate constant K higher than the corresponding one of the unmodified polyethyleneterephthalate at 208° C. and very near to that of the polyethyleneterephthalate at 200° C.

We claim:

1. A process for preparing molded thermoplastic manufactured articles, from compositions comprising:

A. a polyester resin, optionally branched by means of an amount of monomers having functionality >2 and not higher than 1.5% by moles, having a crystalline phase and present in the compositions in amount by weight equal to 90-40% of the sum of the weights of components A and B;

B. a polyester resin comprising polyoxyperfluoroalkylene blocks, said resin being present in the compositions in amounts by weight equal to 10-60% of the sum of the weights of the components A and B, said resin being obtained by an extraction treatment of the condensation product of i) a non fluorinated bicarboxylic acid, ii) a perfluoropolyether diol, and iii) a non fluorinated diol, said extraction treatment comprising:

a) heat-dissolution in 1,1,2,2-tetrachloroethane of the condensation product of the monomers and subsequent precipitation in an excess of 1,1,2-trichloro-1,2,2-trifluoroethane; b) filtration of the precipitated polymer and repetition of the same dissolution treatment and precipitation; c) recovery by filtration of the solid residue; the content in fluorine by weight of the resin B being comprised between 0.6 and 15% of the weight of the resin itself;

said process comprising i) adding said compositions to a mold and ii) crystallizing said compositions in the mold; said compositions having a content of fluorine by weight comprised between 0.1 and 10% of the total weight of the compositions.

2. The process according to claim 1, characterized in that the composition further comprises a nucleating agent selected from the group consisting of mineral nucleating agents and the organic salts of the alkaline or alkaline-earth metals.

3. The process according to claim 1, characterized in that the polyester resin in one or in both components derives from the condensation of terephthalic acid with ethylene glycol or 1,4-butandiol and a polyoxyalkyleneglycol.

4. A composition comprising:

A) polyester resin, optionally branched by means of an amount of monomers having functionality >2 not higher than 1.5% by moles, having a crystalline phase and in amount by weight equal to 90-40% of the sum of the weights of components A and B;

B) polyester resin comprising polyoxyperfluoro-alkylene blocks, said resin being present in the composition in amounts by weight equal to 10–60% of the sum of the weights of the components A and B, said resin being obtained by extraction of the condensation product of a non fluorinated bicarboxylic acid, a perfluoropolyether diol and a non fluorinated diol, said extraction comprising:

a) heat-dissolution in 1,1,2,2-tetrachloroethane of the condensation product of the monomers and subsequent precipitation in an excess of 1,1,2-trichloro-1,2,2-trifluoroethane; b) filtration of the precipitated polymer and repetition of the same dissolution treatment and precipitation; c) recovery by filtration of the solid residue; the content of fluorine by weight of the resin B being comprised between 0.6 and 15% of the weight of the resin itself;

said composition having a content of fluorine by weight comprised between 0.1 and 10% of the total weight of the composition.

5. Manufactured articles obtained from a composition according to claim 4.

6. The composition according to claim 4 characterized in that the amount of fluorine by weight is comprised between 0.5 and 2% of the total weight of the composition.

7. The composition according to claim 4 characterized in that the composition further comprises a nucleating agent selected from the mineral nucleating agents and the organic salts of the alkaline or alkaline-earth metals.

8. The composition according to claim 4 characterized in that the polyester resin of the component A, the one of the component B or both are polyethyleneterephthalates, derived from the condensation of terephthalic acid, optionally in mixture with orthophthalic or isophthalic acids or derivatives thereof in amounts by moles not greater than 10% of the total moles of acid, or the derivatives thereof, with ethylene glycol or a derivative thereof.

9. The composition according to claim 4 characterized in that the polyester resin in one or in both components derives from the condensation of terephthalic acid with ethylene glycol or 1,4-butandiol and a polyoxyalkyleneglycol.

10. The composition according to claim 4 wherein the perfluoropolyether diol of component B has a molecule weight of between about 500 and 8,000 and is present in mole amounts comprised between 0.05 and 20% with respect to the moles of the nonfluorinated bicarboxylic acid and is selected from the group consisting of:

i) $HO—(CH_2CH_2O)_z—CH_2CF_2O—(CF_2CF_2Q)_m(CF2O)_n—CF_2CH_2—(OCH_2CH_2)_zOH$ wherein Z is 0, 1, 2 or 3: the m/n ratio is comprised between 0.2 and 2, m and n have such values that the molecular weight is in the above indicated limits, the units $(CF_2CF_2O)$ and $(CF_2O)$ being randomly distributed inside $(CF_2CF_2O)_m—(CF_2O)_n$;

ii) $HO—CH_2CF_2—(C_3F_6O)_r(CF_2CF_2O)_s(CFXO)_t—CF_2CH_2—OH$ wherein X=F or $CF_3$; $(C_3F_6O)$ is $(CF_2CF(CF_3)O)$ or $(CF(CF_3)CF_2O)$; r, s, and t have such values that the molecular weight is in the above indicated limits, the units $(C_3F_6O)$, $(CF_2CF_2O)$ and $(CFXO)$ being randomly distributed inside $(C_3F_6O)_p(C_2—CF_2O)_r,(CFXO)_t$;

iii) $HO—CH_2CF_2CH_2, —(OCF_2CF_2CH_2)p—O—R_f—O—(CH_2CF_2CF_2O)_qCH_2CF_2CH_2—OH$ wherein $R_f$ is a perfluoroalkylene group; p and q have such values that the molecular weight is in the above indicated limits; and iv) $A—CF(CF_3)—(OCF_2CF(CF_3))a—OCF2—R_f—CF_2O—(CF(CF_3)CF_2O)_b—CF(CF_3)—A'$ wherein $R_f$ is a perfluoroalkylene group; A and A' are end groups containing an hydroxyl; and a and b have such values that the molecular weight is in the above indicated limits.

11. The composition according to claim 10 wherein the m/n ratio is 0.5 to 1.5.

12. The composition according to claim 10 wherein the end groups are $CH_2OH$.

\* \* \* \* \*